United States Patent Office 3,143,528
Patented Aug. 4, 1964

3,143,528
ALKANOLAMINES, ALKANOLAMINE BORATES AND ALKANOLAMINE BORONATES AS ADDITIVES FOR POLYAMIDES
Arnold B. Finestone, Leominster, Mass., and Frederick R. Eirich, Brooklyn, N.Y., assignors to Foster Grant Co., Inc., Leominster, Mass., a corporation of Delaware
Filed Mar. 29, 1961, Ser. No. 99,137
15 Claims. (Cl. 260—78)

This invention relates generally to synthetic linear polyamides. More specifically, this invention relates to linear polyamides or "nylons" of relatively high density and substantially uniform crystallinity as a result of the incorporation therein of certain additives, separately or in admixture.

Polyamides or nylon materials, thermoplastic in nature, possess extremely desirable mechanical and molding properties, viz., toughness, rigidity, abrasion and chemical resistance, good flow properties, heat resistance, high elastic recovery and good impact resistance. Because of these properties, nylon materials have many commercial uses, viz., as fibers, gears and other machine parts, sundries, electrical insulation, tire cords, fishing rods, etc.

Polyamides comprise two basic types. The first type comprises monoaminomonocarboxylic acids and/or their esters, amides or lactams, which are capable of self-condensing to form polymers of the general type:

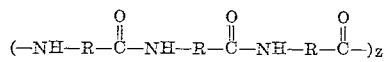

The second type comprises linear polymers of the general type:

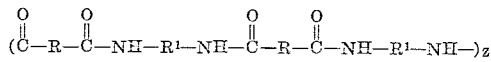

resulting from the reaction of diamines and dicarboxylic acids. The symbols R and $R^1$ in the foregoing formulae may be any organic radicals, preferably hydrocarbon radicals and Z represents the number of units in the chain.

Figure 1:
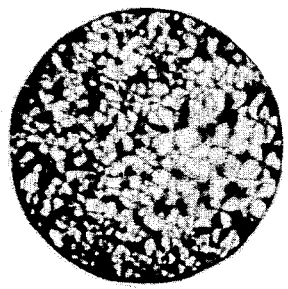

These polyamides in their solid form normally comprise large, non-uniformly sized crystals as in FIGURE 1 showing a photomicrograph of Nylon–6 materials under a polarized microscope of (400×) magnification. Since nylon materials have slow crystallization or solidification rates, slow molding cycles and hot molds are usually employed when injection molding these materials in order to prevent sticking of the nylon materials to the mold cavity blocks.

Most unexpectedly we have found that the crystallization or solidification rate of polyamides may be increased by incorporation of one or more of the additives of the invention, which additives are hereinafter described in greater detail. Apparently, as indicated by increased density and by photomicrographs, substantial small, discrete uniform crystals are formed by addition of the additives. By virtue of the change in crystalline structure, certain molding advantages are obtained, i.e., increased rigidity upon hardening of the molded shot, and decreased sticking resulting in easier removal of the shot from the mold cavity. Thus faster molding cycles may be employed.

More specifically the additives found suitable for purposes of this invention indicate alkanolamines and derivatives thereof. Alkanolamines most advantageously employed include primary, secondary and tertiary amines corresponding to the general formula:

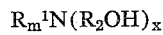

wherein $R^2$ represents a bivalent hydrocarbon alkene radical containing from two to six carbon atoms, $x$ is an integer of from one to three, $m$ varies from zero to two and $R^1$ is hydrogen or an alkyl, aryl, alkaryl, aralkyl, cycloaliphatic radical or mixtures thereof. Specific alkanolamines include mono, di and tri, ethanolamine, propanolamine, isopropanolamine, 3 hydroxytrimethyleneamine, isobutanolamine, 4 hydroxytetramethylene amine, etc. While all of the alkanolamines noted herein give the desired properties noted, in some cases the use of tertiary alkanolamines may be preferred since better color may be thereby achieved. Further specific examples of these products wherein $R^1$ can be other than hydrogen include, N-methyl ethanolamine, N,N-dimethyl ethanolamine, N,N-diethyl ethanolamine, N,N-diisopropyl ethanolamine, N,N-di-(2-ethylhexyl) ethanolamine, N-methyl diethanolamine, N-phenyl ethanolamine, N-phenyl diethanolamine, N-ethyl N-phenyl ethanolamine, N-ethyl N-phenyl isopropanolamine, N-methyl N-phenyl diethanolamine, N-ethyl N-phenyl isopropanolamine, N-phenyl N-propyl ethanolamine, N-benzyl diethanolamine, N-tolyl diethanolamine, etc.

In addition to the alkanolamines we have further found that alkanolamine borates and alkanolamine boronates, i.e., triisopropanolamine borate, triethanolamine borate, diethanolamine phenyl boronate, diethanolamine n-butylboronate, N-methyl diethanolamine phenylboronate, N-ethyl diethanolamine phenylboronate, reaction product of N-phenyl diethanolamine and phenylboronic acid, N-methyl di-ethanolamine cyclohexylboronate, etc. may be advantageously employed as the additive of our invention. The above cyclic esters can be prepared by condensation of a polybasic boron acid and a polyhydroxyalkyl-substituted amine. J. Am. Chem. Soc., 73, 2808 (June, 1951).

The additives of the present invention are employed in amounts of from 0.01% to 2% by weight of the nylon materials with 0.2% to 1% being preferred. While higher amounts of the additives of this invention may be employed no additional benefits are thereby obtained and such practice is economically undesirable. Usually, the additives are dispersed in the nylon materials following polymerization rather than prior to polymerization.

Specific polyamides which may be benefited include the condensation products of monoaminomonocarboxylic acids or derivatives thereof. Illustrations are the condensation products of 6-aminohexanoic acid, 7-aminoheptanoic acid, 8-aminooctanoic acid, 11-aminoundecanoic acid, etc. and their amide, ester and lactam derivatives such as 2-oxo-pentamethylenimine, 2-oxo-hexamethylenimine, 2-oxo-heptamethylenimine, 2-oxo-octamethylenimine, 2-oxo-decamethylenimine, etc. The polyamides employed in this invention are thermoplastic poly-carbonamide linear polyamides.

Also included are the condensation products of dicarboxylic acids such as adipic, suberic, sebacic, isophthalic, terephthalic, hexahydroterephthalic, etc. with any of the diamines of tetramethylene, pentamethylene, hexamethylene, octamethylene, decamethylene, p-xylidine, m-xylidine, p-phenylene, m-phenylene, benzidine, piperazine, etc.

It is important that the alkanolamine or alkanolamine borate be well dispersed in the nylon material. Preferably, satisfactory dispersion can be achieved by adding a liquefied or finely divided alkanolamine or alkanolamine borate to a pelletized nylon material and thoroughly agitating the mixture by conventional methods, for example, by tumbling the mixture during addition and thereafter for several hours, perhaps two to fifteen hours. In the process, the alkanolamine, alkanolamine borate or alkanolamine boronate solidifies on or coats the surface of the polyamide pellets. The mixture is then extruded to insure proper dispersion of the additive in the nylon material.

The following examples are merely illustrative of the invention and are not to be considered as limiting. In these examples all parts are by weight unless otherwise specified, specific gravities are measured by using the standard ASTM-D-792-50 test and viscosities are measured as relative viscosities in a solution containing 1 gram of polymer in 100 cubic centimeters of 98% by weight sulfuric acid at 25° C.

*Example 1*

Commercial grade polycaprolactam pellets having a viscosity of 2.4 are employed. The pellets are melted at a temperature of 410° F. and molded in a conventional molding machine having a cavity designed to form a disc of 2 inch diameter and ⅛ inch thickness, at a ram pressure of 800 p.s.i. A mold clamp time of 30 seconds is employed. The mold temperature is maintained at 40° F.

When the mold is opened it is determined that a disc is formed which tends to stick to the mold cavity and is difficult to remove therefrom without distorting the shape thereof. The specific gravity of the molded disc is 1.134.

*Example 2*

100 parts of polycaprolactam pellets of the type employed in Example 1 are tumbled for four hours with 1 part of molten triisopropanolamine. The tumbled material is extruded in a conventional extruder and then molded as in Example 1. A hard disc, easily separated from the mold is produced.

Figure 2:
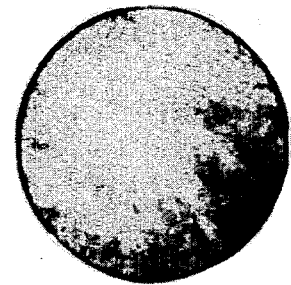

The resultant product possesses uniform crystallinity, as is obvious from the photomicrograph of FIGURE 2. Its specific gravity is 1.140.

*Example 3*

Example 2 is repeated employing 0.5 part of triisopropanolamine instead of 1 part. A hard disc, easily separated from the mold, is produced. Its specific gravity is 1.141.

*Example 4*

Example 2 is repeated employing 1 part of triethanolamine in place of the triisopropanolamine. A hard disc, easily separated from the mold, is produced. Its specific gravity is 1.139.

*Example 5*

Example 2 is repeated employing 0.2 part of N-methyl diethanolamine in place of the triisopropanolamine. A hard disc, easily separated from the mold is produced. Its specific gravity is 1.139.

*Example 6*

Example 2 is repeated employing 1 part of diethanolamine in place of the triisopropanolamine. A hard disc, easily separated from the mold, is produced. Its specific gravity is 1.140.

*Example 7*

Example 2 is repeated employing 1 part of finely divided triisopropanolamine borate in place of the molten triisopropanolamine. A hard disc, easily separated from the mold, is produced. Its specific gravity is 1.141.

*Example 8*

Example 2 is repeated employing 0.5 part of finely divided triethanolamine borate in place of the molten triisopropanolamine. A hard disc, easily separated from the mold, is produced. Its specific gravity is 1.140.

*Example 9*

Example 2 is repeated employing 0.5 part of finely divided diethanolamine phenylboronate in place of the molten triisoprapanolamine. A hard disc, easily separated from the mold, is produced. Its specific gravity is 1.041.

*Example 10*

Example 2 is repeated employing 0.5 part of finely divided n-methyldiethanolamine phenylboronate in place of the molten triisopropanolamine. A hard disc, easily separated from the mold is produced. Its specific gravity is 1.040.

*Example 11*

Commercial grade Nylon 6,6 pellets (the condensation product of hexamethylenediamine and adipic acid) having a viscosity of 2.8 are employed. The pellets are melted at a temperature of 473° F. and molded in a conventional molding machine having a cavity designed to form a disc of 2 inch diameter and ⅛ inch thickness at a ram pressure of 1000 p.s.i.

A mold clamp time of 30 seconds is employed. The mold temperature is maintained at 40° F.

When the mold is opened, it is determined that a disc is formed which tends to stick to the mold caivty and is difficult to remove therefrom without distorting the shape thereof. Its specific gravity is 1.137.

*Example 12*

100 parts of Nylon 6,6 pellets of the type employed in Example 11 are tumbled for six hours with 1 part of molten triisopropanolamine. The tumbled material is extruded and then molded as in Example 11. A hard disc, easily separated from the mold, is produced. Its specific gravity is 1.142.

*Example 13*

Example 12 is repeated employing 1 part of triethanolamine in place of the triisopropanolamine. A hard disc, easily separated from the mold, is produced. Its specific gravity is 1.141.

*Example 14*

Example 12 is repeated employing 1 part of finely divided triethanolamine borate in place of the molten triisopropanolamine. A hard disc, easily separated from the mold, is produced. Its specific gravity is 1.142.

*Example 15*

Example 12 is repeated employing 1 part of a mixture of 50% triethanolamine and 50% triisopropanolamine in place of the triisopropanolamine. A hard disc, easily separated from the mold is produced. Its specific gravity is 1.140.

*Example 16*

Commercial grade Nylon 8, polycaprylactam pellets having a viscosity of 2.2 are employed. The pellets are melted at a temperature of 390° F. and molded in a conventional molding machine having a cavity designed to form a disc of 2 inch diameter and ⅛ inch thickness at a ram pressure of 800 p.s.i. A mold clamp time of 30 seconds is employed. The mold temperature is maintained at 40° F.

When the mold is opened it is determined that a disc is formed which tends to stick to the mold cavity and is difficult to remove therefrom without distorting the shape thereof.

The specific gravity is 1.080.

Example 17

100 parts of Nylon 8 pellets of the type employed in Example 16 are tumbled six hours with 1 part of triisopropanolamine. The tumbled material is extruded in a conventional extruder and then molded as in Example 16. A hard disc, easily separated from the mold is produced.

The specific gravity of the resultant product is 1.086.

Example 18

Example 17 is repeated employing 1 part of N-phenyl ethanolamine is place of the triisopropanolamine. A hard disc, easily separated from the mold, is produced.

The specific gravity of the resultant product is 1.086.

Example 19

Example 17 is repeated employing 0.5 part of N-ethyl N-phenyl ethanolamine in place of the triisopropanolamine. A hard disc is produced which is easily separated from the mold.

The specific gravity of the resultant product is 1.087.

Example 20

Commercial grade Nylon 6,10 pellets (the condensation product of hexamethylene-diamine and sebacic acid) having a viscosity of 2.2 are employed. The pellets are melted at a temperature of 390° F. and molded in a conventional molding machine having a cavity designed to form a disc of 2 inch diameter and ⅛ inch thickness at a ram pressure of 800 p.s.i.

A mold clamp time of 30 seconds is employed. The mold temperature is maintained at 40° F.

When the mold is opened, it is determined that a disc is formed which tends to stick to the mold cavity and is difficulty to remove therefrom without distorting the shape thereof. Its specific gravity is 1.071.

Example 21

100 parts of Nylon 6,10 of the type employed in Example 20 are tumbled for seven hours with 0.5 part of molten triisopropanolamine. The tumbled material is extruded and then molded as in Example 20. A hard disc, easily separated from the mold is produced. Its specific gravity is 1.078.

The following is a chart of physical properties for the polycaprolactam of Example 1 and the polycaprolactam of Examples 2 and 3 having the additives of this invention incorporated therein.

| | Example 1 | Example 2 | Example 3 |
|---|---|---|---|
| Tensile at Yield (p.s.i.) | 10,446 | 11,029 | 11,285 |
| Elongation at Yield (percent) | 4.26 | 4.10 | 3.89 |
| Tensile at Fail (p.s.i.) | 6,472 | 8,828 | 10,330 |
| Elongation at Fail (Percent) | 51.3 | 48.2 | 35.2 |
| Tensile Modulus ($\times 10^5$ p.s.i.) | 3.86 | 4.20 | 4.58 |
| Flexural Str. at Yield (p.s.i.) | 14,783 | 15,447 | 15,796 |
| Deflection at Yield (inches) | 0.645 | 0.612 | 0.614 |
| Specific Gravity | 1.134 | 1.140 | 1.141 |

As can readily be seen from the examples shown, the additives of this invention increase the density and crystalline uniformity of nylon materials without adversely affecting their other physical properties. As a result, the molding cycle time is shortened and the mold sticking problem is reduced.

Many changes and alterations may be made without departing from the spirit and scope of this invention. The following claims are to be defined as broadly as possible in view of the prior art.

We claim:

1. A solid synthetic linear polyamide composition having enhanced crystalline uniformity and wherein the polyamide is a thermoplastic poly-carbonamide, said polyamide composition having dispersed therein from about 0.01 to 2% by weight of at least one additive selected from the class consisting of (1) alkanolamines having the general formula:

$$R_m^1N(R^2OH)_x$$

wherein $R^2$ represents a bivalent radical containing from two to six carbon atoms, $x$ is an integer from one to three, $m$ varies from zero to two and $R^1$ is a radical selected from the class consisting of hydrogen, alkyl, aryl, alkaryl, cycloaliphatic and aralkyl radicals, (2) alkanolamine borates and (3) alkanolamine boronates.

2. A solid synthetic linear polyamide composition having enhanced crystalline uniformity and wherein the polyamide is a thermoplastic poly-carbonamide, said polyamide composition having dispersed therein from about 0.01 to 2% by weight of at least one alkanolamine having the general formula:

$$R_m^1N(R^2OH)_x$$

wherein $R^2$ represents a bivalent radical containing from two to six carbon atoms, $x$ is an integer from one to three, $m$ varies from zero to two and $R^1$ is a radical selected from the class consisting of hydrogen, alkyl, aryl, cycloaliphatic and aralkyl radicals.

3. A solid synthetic linear polyamide composition having enhanced crystalline uniformity and wherein the polyamide is a thermoplastic poly-carbonamide, said polyamide composition having dispersed therein from about 0.01 to 2% by weight of triisopropanol amine.

4. A solid synthetic linear polyamide composition having enhanced crystalline uniformity and wherein the polyamide is a thermoplastic poly-carbonamide, said polyamide composition having dispersed therein from about 0.01 to 2% by weight of triethanolamine.

5. A solid synthetic linear polyamide composition having enhanced crystalline uniformity and wherein the polyamide is a thermoplastic poly-carbonamide, said polyamide composition having dispersed therein from about 0.01 to 2% by weight of a triisopropanol amine borate.

6. A solid synthetic linear polyamide composition having enhanced crystalline uniformity and wherein the polyamide is a thermoplastic poly-carbonamide, said polyamide composition having dispersed therein from about 0.01 to 2% by weight of triethanolamine borate.

7. A solid synthetic linear polyamide composition having enhanced crystalline uniformity and wherein the polyamide is a thermoplastic poly-carbonamide, said polyamide composition having dispersed therein from about 0.01 to 2% by weight of an alkanolamine boronate.

8. A solid synthetic linear polyamide composition having enhanced crystalline uniformity and wherein the polyamide is a thermoplastic poly-carbonamide, said polyamide composition having dispersed therein from about 0.01 to 2% by weight of a diethanolamine phenylboronate.

9. A solid synthetic linear polyamide composition having enhanced crystalline uniformity and wherein the polyamide is a thermoplastic poly-carbonamide, said polyamide composition having dispersed therein from about 0.01 to 2% by weight of alkanolamine borate.

10. A composition of claim 2 wherein the polyamide is polycaprolactam.

11. A composition of claim 9 wherein the polyamide is polycaprolactam.

12. A composition of claim 10 wherein the polyamide is polycaprolactam.

13. A method of increasing the crystallization rate and crystallinity of a solid synthetic linear polyamide polymeric composition, said polyamide being a thermoplastic poly-carbonamide, by mechanically dispersing in a molten polyamide an effective amount of between 0.01 to about 2% by weight of at least one alkanolamine having the general formula:

$$R_m^1N(R^2OH)_x$$

wherein $R^2$ represents a bivalent radical containing from two to six carbon atoms, $x$ is an integer from one to three, $m$ varies from zero to two and $R^1$ is a radical selected from the class consisting of hydrogen, alkyl, aryl, cycloaliphatic and aralkyl radicals.

14. A method of increasing the crystallization rate and crystallinity of a solid synthetic linear polyamide polymeric composition, said polyamide being a thermoplastic poly-carbonamide by mechanically dispersing in a molten polyamide an effective amount of between 0.01 to about 2% by weight of at least one alkanolamine boronate.

15. A method of increasing the crystallization rate and crystallinity of a solid synthetic linear polyamide polymeric composition, said polyamide being a thermoplastic poly-carbonamide, by mechanically dispersing in a molten polyamide an effective amount of between 0.01 to about 2% by weight of at least one alkanolamine borate.

References Cited in the file of this patent

UNITED STATES PATENTS

| | | |
|---|---|---|
| 2,264,293 | Brubaker | Dec. 2, 1941 |
| 2,673,912 | Wallace et al. | Mar. 30, 1954 |
| 2,934,517 | Young | Apr. 26, 1960 |

FOREIGN PATENTS

| | | |
|---|---|---|
| 541,072 | Great Britain | Nov. 12, 1941 |

UNITED STATES PATENT OFFICE
CERTIFICATE OF CORRECTION

Patent No. 3,143,528                                                August 4, 1964

Arnold B. Finestone et al.

It is hereby certified that error appears in the above numbered patent requiring correction and that the said Letters Patent should read as corrected below.

Column 6, line 62, for the claim reference numeral "10" read -- 7 --.

Signed and sealed this 6th day of April 1965.

(SEAL)
Attest:

ERNEST W. SWIDER
Attesting Officer

EDWARD J. BRENNER
Commissioner of Patents